US008810169B2

(12) United States Patent
Thyagarajan (10) Patent No.: US 8,810,169 B2
(45) Date of Patent: Aug. 19, 2014

(54) METHOD AND SYSTEM FOR ESTIMATING ROTOR ANGLE OF AN ELECTRIC MACHINE

(75) Inventor: Lav Thyagarajan, West Fargo, ND (US)

(73) Assignee: Deere & Company, Moline, IL (US)

( * ) Notice: Subject to any disclaimer, the term of this patent is extended or adjusted under 35 U.S.C. 154(b) by 289 days.

(21) Appl. No.: 13/273,376

(22) Filed: Oct. 14, 2011

(65) Prior Publication Data

US 2013/0093372 A1  Apr. 18, 2013

(51) Int. Cl.
*H02P 6/16* (2006.01)
*H02P 6/06* (2006.01)

(52) U.S. Cl.
CPC .................................. *H02P 6/06* (2013.01)
USPC .................. 318/400.04; 318/400.01; 318/700

(58) Field of Classification Search
CPC ......................................................... H02P 6/06
USPC ................................ 318/400.04, 400.01, 700
See application file for complete search history.

(56) References Cited

U.S. PATENT DOCUMENTS

| 6,525,502 | B1 * | 2/2003 | Piedl et al. ..................... 318/605 |
| 6,583,593 | B2 * | 6/2003 | Iijima et al. .............. 318/400.32 |
| 7,362,070 | B2 * | 4/2008 | Games et al. ................. 318/605 |
| 7,710,054 | B2 * | 5/2010 | Alberkrack et al. ..... 318/400.06 |
| 2007/0031131 | A1 | 2/2007 | Griffitts |
| 2011/0127938 | A1 | 6/2011 | Kawakami et al. |

OTHER PUBLICATIONS

European Search Report in counterpart application No. 12186812.9, dated Mar. 31, 2014 (10 pages).

* cited by examiner

*Primary Examiner* — David Luo (57) ABSTRACT

Position samples are stored from an encoder coupled to a permanent magnet electric machine. A data processor determines first changes in position between successive position samples and second changes between successive first changes in position. A data processor determines whether each first change in position is generally increasing, decreasing or constant. A corrective motion factor is applied to each stored position sample based on whether the first change in position is generally increasing or decreasing. The data processor estimates a final rotor angle of the electric machine based on a particular one of the position samples and a corresponding first change in position associated with the particular one of the position samples corresponding to a respective time.

20 Claims, 7 Drawing Sheets

METHOD AND SYSTEM FOR ESTIMATING ROTOR ANGLE OF AN ELECTRIC MACHINE

FIELD OF THE INVENTION

This invention relates to a method and system for estimating rotor angle or rotor position of an electric machine.

BACKGROUND OF THE INVENTION

An electric machine or electric motor may feature a rotor with permanent magnets and a stator. For example, the electric machine may comprise a permanent magnet (PM) motor, an interior permanent magnet (IPM) motor, or IPM synchronous motor. The electric machine may have a rotor angle or rotor position that is difficult to estimate accurately with the application of conventional approaches.

There are several different conventional technical approaches for estimating an initial rotor position of an electric machine. Under a first approach, because the back-electromotive force (back-EMF) voltages of a motor are functions of the rotor position with respect to the stator, a sensor may extract rotor position information from the back-EMP waveform of an unexcited phase of a multi-phase alternating current motor. However, the first approach is not suitable for estimating the rotor position if the motor is operating at low rotational speeds because the back-EMF voltages are frequently too low to be accurately detected at low rotational speeds below a speed threshold (e.g., 100 revolutions per minute). In addition, electromagnetic noise or interference from switching transients in one or more current-carrying phases of the electric machine can lead to error in estimates of rotor position.

Under a second approach, a computer estimates the rotor position based on phase voltages and phase currents of the electric machine. For example, the computer may be associated with a Kalman filter to estimate the rotor position. The second approach is often computationally intensive and susceptible to quantification errors, truncation errors, and measurement inaccuracies. The rotor position estimate of the second approach may be inaccurate when the motor is operating at low speeds below a speed threshold (e.g., 100 revolutions per minute (RPM)) because of the drift of integration functions, for example. To be sufficiently accurate, the second approach generally needs to compensate for changes in motor parameters associated with temperature change, which contributes to the complexity of the computations.

Under a third approach, the rotor saliency in permanent magnet motors is used to estimate rotor position based on the asymmetrical rotor structure or magnetic saturation. The third approach may use the injection of a high frequency test signal into control terminals of the motor. Although the third approach works at low rotational speeds of the motor and is generally independent of rotor speed, the third technique cannot be used with non-salient permanent magnet motors, such surface mount, permanent magnet alternating current motors without rotor saliency. Thus, there is a need for an improved method and system for estimating rotor angle or rotor position of an electric machine to address one or more of the above noted deficiencies.

SUMMARY OF THE INVENTION

In one embodiment, a method and system for estimating rotor angle of an electric machine receives position samples from an encoder coupled to a permanent magnet electric machine. The position samples are stored in a data storage device. A data processor determines a first plurality of first changes in position (e.g., $\Delta_{P1}$) between successive position samples. A data processor determines a second plurality of second changes (e.g., $\Delta_{P2}$) between successive first changes in position. A data processor determines whether each first change in position (e.g., $\Delta_{P1}$) is generally increasing, decreasing or constant. A corrective motion factor (e.g., speed factor $(\Delta_{P1}*n)$+acceleration factor $(\Delta_{P2}*m)$) is applied to each stored position sample based on whether the first change in position is generally increasing or decreasing. The data processor estimates a final rotor angle of the electric machine based on a particular one of the position samples and a corresponding first change in position associated with the particular one of the position samples corresponding to a respective time.

DESCRIPTION OF THE PREFERRED EMBODIMENT

Figure 1A:
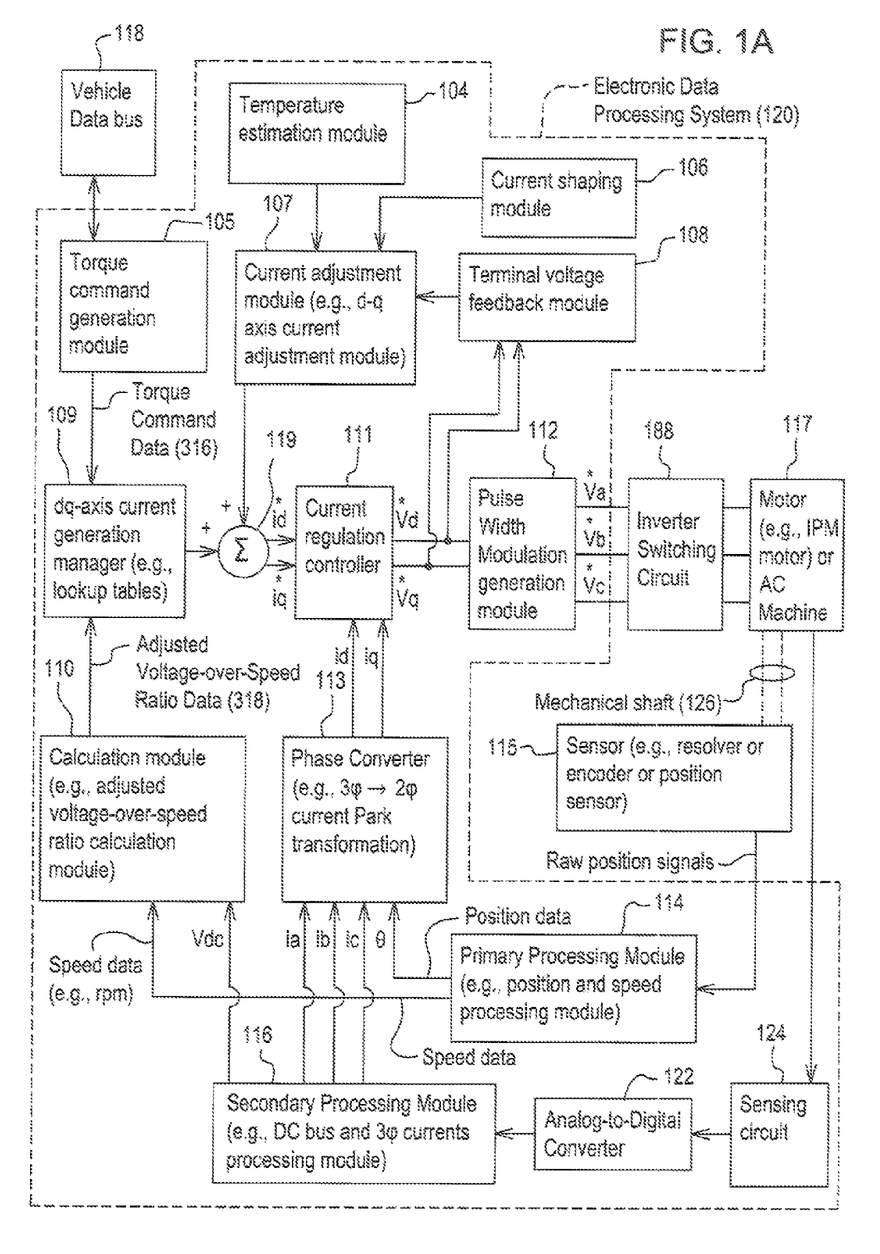
FIG. 1A is a block diagram of one embodiment of a system for estimating rotor angle or rotor position of an electric machine.

In accordance with one embodiment, FIG. 1A discloses system for controlling a motor 117 (e.g., an interior permanent magnet (IPM) motor) or another alternating current electric machine. In one embodiment, the system, aside from the motor 117, may be referred to as an inverter or a motor controller.

The system comprises electronic modules, software modules, or both. In one embodiment, the motor controller comprises an electronic data processing system 120 to support storing, processing or execution of software instructions of one or more software modules. The electronic data processing system 120 is indicated by the dashed lines in FIG. 1A and is shown in greater detail in FIG. 2.

The data processing system 120 is coupled to an inverter circuit 188. The inverter circuit 188 comprises a semiconductor drive circuit that drives or controls switching semiconductors (e.g., insulated gate bipolar transistors (IGBT) or other power transistors) to output control signals for the motor 117. In turn, the inverter circuit 188 is coupled to the motor 117 or electric machine.

The motor 117 is associated with a sensor 115 (e.g., a position sensor, a resolver or encoder position sensor) that is associated with the motor shaft 126 or the rotor. The motor shaft 126 is shown as dashed lines because the motor shaft 126 may or may not be mechanically connected or coupled to the sensor 115. If the sensor 115 is not mechanically connected or coupled to the motor shaft 126, the sensor 115 senses electromagnetic fields or fields associated with one or more magnets mounted on the motor shaft 126 or the rotor.

The sensor 115 and the motor 117 (or electric machine) are coupled to the data processing system 120 to provide feedback data (e.g., current feedback data, such as $i_a$, $i_b$, $i_c$), raw position signals, among other possible feedback data or signals, for example. Other possible feedback data includes, but is not limited to, winding temperature readings, semiconductor temperature readings of the inverter circuit 188, three phase voltage data, or other thermal or performance information for the motor 117.

In one embodiment, the torque command generation module 105 is coupled to a d-q axis current generation manager 109 (e.g., d-q axis current generation look-up tables). D-q axis current refers to the direct axis current and the quadrature axis current as applicable in the context of vector-controlled alternating current machines, such as the motor 117. The output of the d-q axis current generation manager 109 and the output of a current adjustment module 107 (e.g., d-q axis current adjustment module 107) are fed to a summer 119. In turn, one or more outputs (e.g., direct axis current data ($i_d^*$) and quadrature axis current data ($i_q^*$)) of the summer 119 are provided or coupled to a current regulation controller 111.

The current regulation controller 111 is capable of communicating with the pulse-width modulation (PWM) generation module 112 (e.g., space vector PWM generation module). The current regulation controller 111 receives respective d-q axis current commands (e.g., $i_d^*$ and $i_q^*$) and actual d-q axis currents (e.g., $i_d$ and $i_q$) and outputs corresponding d-q axis voltage commands (e.g., $v_d^*$ and $v_q^*$ commands) for input to the PWM generation module 112.

In one embodiment, the PWM generation module 112 converts the direct axis voltage and quadrature axis voltage data from two phase data representations into three phase representations (e.g., three phase voltage representations, such as $v_a^*$, $v_b^*$ and $v_c^*$) for control of the motor 117, for example. Outputs of the PWM generation module 112 are coupled to the inverter 188.

The inverter circuit 188 comprises power electronics, such as switching semiconductors to generate, modify and control pulse-width modulated signals or other alternating current signals (e.g., pulse, square wave, sinusoidal, or other waveforms) applied to the motor 117. The PWM generation module 112 provides inputs to a driver stage within the inverter circuit 188. An output stage of the inverter circuit 188 provides a pulse-width modulated voltage waveform, or other voltage signal for control of the motor. In one embodiment, the inverter 188 is powered by a direct current (DC) voltage bus.

The motor 117 (or electric machine) is associated with a sensor 115 (e.g., a resolver, encoder, speed sensor, or another position sensor or speed sensors) that estimates at least one of an angular position of the motor shaft 126, a speed or velocity of the motor shaft 126, and a direction of rotation of the motor shaft 126. The sensor 115 may be mounted on or integral with the motor shaft 126. Alternatively, the sensor 115 may comprise a contactless sensor or magnetic field sensor (206 in FIG. 1B) that is spaced apart from the motor shaft 126. The output of the sensor 115 is capable of communication with the primary processing module 114 (e.g., position and speed processing module). In one embodiment, the sensor 115 may be coupled to an analog-to-digital converter (not shown) that converts analog position data or velocity data to digital position or velocity data, respectively. In other embodiments, the sensor 115 (e.g., digital position encoder) may provide a digital data output of position data or velocity data for the motor shaft 126 or rotor.

A first output (e.g., position data and speed data for the motor 117) of the primary processing module 114 is communicated to the phase converter 113 (e.g., three-phase to two-phase current Park transformation module) that converts respective three-phase digital representations of measured current into corresponding two-phase digital representations of measured current. A second output (e.g., speed data) of the primary processing module 114 is communicated to the calculation module 110 (e.g., adjusted voltage over speed ratio module).

An input of a sensing circuit 124 is coupled to terminals of the motor 117 for sensing at least the measured three-phase currents and a voltage level of the direct current (DC) bus (e.g., high voltage DC bus which may provide DC power to the inverter circuit 188). An output of the sensing circuit 124 is coupled to an analog-to-digital converter 122 for digitizing the output of the sensing circuit 124. In turn, the digital output of the analog-to-digital converter 122 is coupled to the secondary processing module 116 (e.g., Direct current (DC) bus and three phase current processing module). For example, the sensing circuit 124 is associated with the motor 117 for measuring three phase currents (e.g., current applied to the windings of the motor 117, back EMF induced into the windings, or both).

Certain outputs of primary processing module 114 and the secondary processing module 116 feed the phase converter 113. For example, the phase converter 113 may apply a Park transformation or other conversion equations (e.g., certain conversion equations that are suitable are known to those of ordinary skill in the art) to convert the measured three-phase representations of current into two-phase representations of current based on the digital three-phase current data from the secondary processing module 116 and position data from the sensor 115. The output of the phase converter 113 module is coupled to the current regulation controller 111.

Other outputs of the primary processing module 114 and the secondary processing module 116 may be coupled to inputs of the calculation module 110 (e.g., adjusted voltage over-speed ratio calculation module). For example, the primary processing module 114 may provide one or more of the following: speed data (e.g., motor shaft 126 revolutions per minute) for the rotor, acceleration data for the rotor, angular position data, an initial rotor angle, a final rotor angle, or an initial rotor angle upon start up of the inverter switching circuit 188 or inverter. The secondary processing module 116 may provide a measured level of direct current voltage (e.g., on the direct current (DC) bus of a vehicle). The direct current voltage level on the DC bus that supplies the inverter circuit 188 with electrical energy may fluctuate or vary because of various factors, including, but not limited to, ambient temperature, battery condition, battery charge state, battery resistance or reactance, fuel cell state (if applicable), motor load conditions, respective motor torque and corresponding operational speed, and vehicle electrical loads (e.g., electrically driven air-conditioning compressor). The calculation module 110 is connected as an intermediary between the secondary processing module 116 and the dq-axis current generation manager 109. The output of the calculation module 110 can adjust or impact current commands generated by the d-q axis current generation manager 109 to compensate for fluctuation or variation in direct current bus voltage, among other things.

The temperature estimation module 104, the current shaping module 106, and the terminal voltage feedback module 108 are coupled to or are capable of communicating with the dq-axis current adjustment module 107. In turn, the d-q axis current module 107 may communicate with the dq-axis current generation manager or the summer 119.

The temperature estimation module 104 estimates or determines the temperature of the rotor permanent magnet or magnets. In one embodiment, the temperature estimation module 104 may estimate the temperature of the rotor magnets from one or more sensors located on the stator, in thermal communication with the stator, or secured to the housing of the motor 117.

In another alternative embodiment, the rotor magnet temperature estimation module 104 may be replaced with a temperature detector (e.g., a thermistor or infrared thermal sensor coupled to wireless transmitter) mounted on or near the rotor or the magnet, where the detector provides a signal (e.g., wireless signal) indicative of the temperature of the magnet or magnets.

In one embodiment, the method or system may operate in the following manner. The torque command generation module 105 receives an input control data message, such as a speed control data message, a voltage control data message, or a torque control data message, over a vehicle data bus 118. The torque command generation module 105 converts the received input control message into torque control command data 316.

The d-q axis current generation manager 109 selects or determines the direct axis current command data and the quadrature axis current command data associated with respective torque control command data and respective detected speed data of the motor shaft 126. For example, the d-q axis current generation manager 109 selects or determines the direct axis current command, the quadrature axis current command by accessing one or more of the following: (1) a look-up table, database or other data structure that relates respective torque commands to corresponding direct and quadrature axes currents, (2) a set of quadratic equations or linear equations that relate respective torque commands to corresponding direct and quadrature axes currents, or (3) a set of rules (e.g., if-then rules) that relates respective torque commands to corresponding direct and quadrature axes currents. The sensor 115 on the motor 117 facilitates provision of the detected speed data for the motor shaft 126, where the primary processing module 114 may convert position data provided by the sensor 115 into speed data.

The current adjustment module 107 (e.g., d-q axis current adjustment module) provides current adjustment data to adjust the direct axis current command data and the quadrature axis current command data based on input data from the rotor magnet temperature estimation module 104 and the current shaping module 106 and terminal voltage feedback module 108.

The current shaping module 106 may determine a correction or preliminary adjustment of the quadrature axis (q-axis) current command and the direct axis (d-axis) current command based on one or more of the following factors: torque load on the motor 117 and speed of the motor 117, for example. The temperature estimation module 104 may generate a secondary adjustment of the q-axis current command and the d-axis current command based on an estimated change in rotor temperature. The terminal voltage feedback module 108 may provide a third adjustment to the d-axis current command and q-axis current command based on a controller voltage command versus a voltage limit. The current adjustment module 107 may provide an aggregate current adjustment that considers the preliminary adjustment, one of the secondary adjustment and the third adjustment.

In one embodiment, the motor 117 may comprise an interior permanent magnet (IPM) machine or a synchronous IPM machine (IPMSM). An IPMSM has many favorable advantages compared with conventional induction machines or surface mounted PM machines (SMPM) such as high efficiency, high power density, wide constant power operating region, maintenance free, for instance.

The sensor 115 (e.g., shaft or rotor speed detector) may comprise one or more of the following: a direct current motor, an optical encoder, a magnetic field sensor (e.g., Hall Effect sensor), magneto-resistive sensor, and a resolver (e.g., a brushless resolver). In one configuration, the sensor 115 comprises a position sensor, where position data and associated time data are processed to determine speed or velocity data for the motor shaft 126. In another configuration, the sensor 115 comprises a speed sensor, or the combination of a speed sensor and an integrator to determine the position of the motor shaft.

In yet another configuration, the sensor 115 comprises an auxiliary, compact direct current generator that is coupled mechanically to the motor shaft 126 of the motor 117 to determine speed of the motor shaft 126, where the direct current generator produces an output voltage proportional to the rotational speed of the motor shaft 126. In still another configuration, the sensor 115 comprises an optical encoder with an optical source that transmits a signal toward a rotating object coupled to the shaft 126 and receives a reflected or diffracted signal at an optical detector, where the frequency of received signal pulses (e.g., square waves) may be proportional to a speed of the motor shaft 126. In an additional configuration, the sensor 115 comprises a resolver with a first winding and a second winding, where the first winding is fed with an alternating current, where the voltage induced in the second winding varies with the frequency of rotation of the rotor.

Figure 1B:
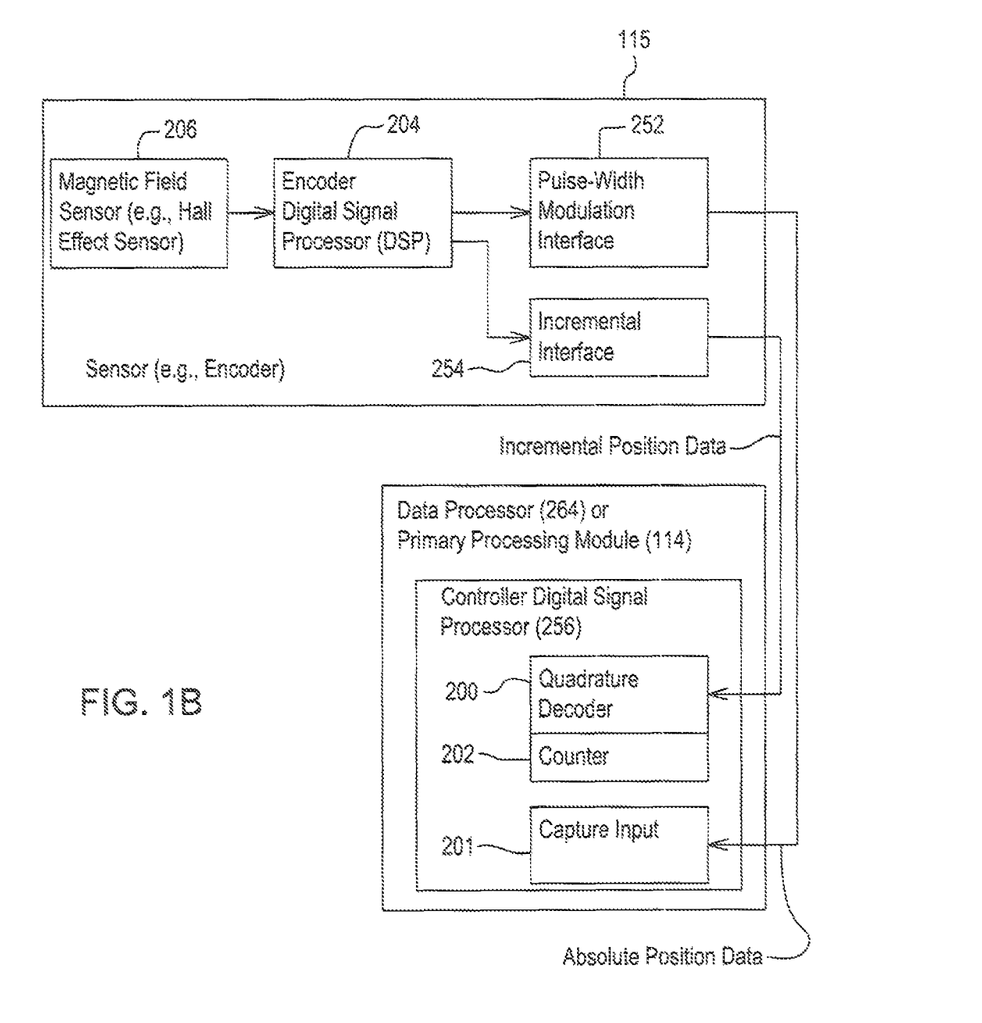
FIG. 1B is a block diagram of sensor (e.g., encoder) of FIG. 1A in greater detail and the sensor's relationship to the data processing system.

FIG. 1B shows an illustrative example of a sensor 115 (e.g., encoder) of FIG. 1A and the sensor's relationship with the electronic data processing system 120. In one embodiment, the sensor 115 communicates position data or one or more signals indicative of rotor angle to the data processor 264, a primary processing module 114, or both. For example, the position data may comprise absolute position data, incremental position data, whereas the signals may comprise one or more pulse-width modulated signals, differential signals, square wave signals, or sinusoidal signals. In one possible configuration, the sensor 115 may communicate to the electronic data processing system 120 via the third data port 272 (in FIG. 2) and the data processor 264 (in FIG. 2), where the data processor 264 comprises a controller digital signal processor 256 (e.g., of FIG. 1B).

As illustrated in FIG. 1B, the sensor 115 comprises a magnetic field sensor 206 (e.g., Hall Effect sensor array), an encoder digital signal processor 204, a pulse width modulation (PWM) interface 252, and an incremental interface 254. In an alternate embodiment, the PWM interface 252 and the incremental interface 254 may be replaced with one or more data ports (e.g., serial data ports or a universal serial data port).

The magnetic field sensor 206 is coupled to the encoder digital signal processor 204 for communication with the encoder digital signal processor 204. In turn, the encoder digital signal processor 204 is coupled to the PWM interface 252 and the incremental interface 254. The lines that interconnect the magnetic field sensor 206, the encoder digital signal processor 204, the PWM interface 252 and incremental interface 254 comprise physical data paths (e.g., one or more data busses), logical data paths (e.g., communication between software modules), or both.

The controller digital signal processor 256 further comprises a capture input 201 and a decoder 200 (e.g., quadrature decoder) with a counter 202. In one embodiment, the capture input 201 comprises a data port, demodulator or a pulse edge decoder for decoding pulse edges of the absolute position data or pulse modulated signal from the sensor 115. The decoder 200 may comprise a quadrature decoder, or the combination of a quadrature decoder and a counter 202. In configuration, the decoder 200 may detect, decode or demodulate position data one or more pulse width modulated signals or another signals indicative of the estimated rotor angle of the electric machine 117. For example, counter 202 may comprise a counter within a decoder for counting or tracking the number of pulse edges of a pulse width modulation signal outputted by the magnetic field sensor 206 during a corresponding time interval.

In one configuration, the counter 202 is associated with (or a part of) a quadrature decoder 200. The counter 202 can be arranged to compensate the final rotor angle in counts that are automatically scaled or adjusted based on encoder resolution. For example, the counter 202 may be synchronized to the PWM signal (e.g., outputted by the PWM interface 252) of the sensor 115 (e.g., encoder) to facilitate counts that are automatically scaled or adjusted based on encoder resolution.

In FIG. 1B, the magnetic field sensor 206 senses or observes a magnetic field or changes in magnetic field associated with rotation of the shaft 126 or rotor of the electric machine (e.g., motor 117). The magnetic field sensor 206 provides observed magnetic field data to the digital signal processor 204. In turn, the encoder digital signal processor 204 estimates a rotor angle or velocity based on the observed magnetic field data. The pulse width modulation 200 interface outputs a pulse width modulated signal indicative of the rotor angle or the initial rotor angle, for example. The controller digital signal processor 256 or the data processor 264 execute compensatory software instructions or corrective equations of the primary processing module 114 to enhance the accuracy of the estimated rotor angle or velocity provided by the sensor 115 as explained in further detail in this document.

Figure 2:
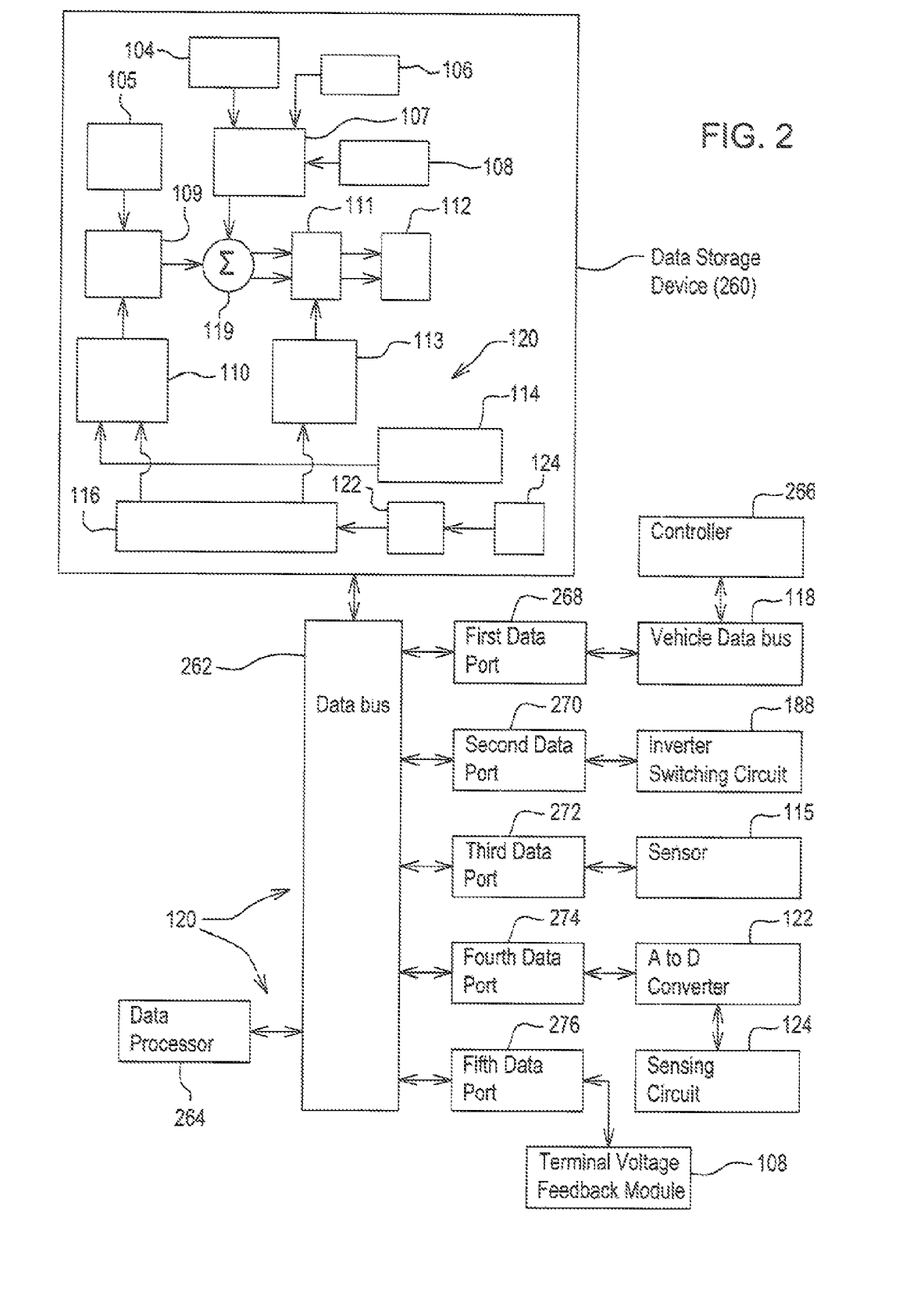
FIG. 2 is a block diagram of an electronic data processing system consistent with FIG. 1A.

In FIG. 2, the electronic data processing system 120 comprises an electronic data processor 264, a data bus 262, a data storage device 260, and one or more data ports (268, 270, 272, 274 and 276). The data processor 264, the data storage device 260 and one or more data ports are coupled to the data bus 262 to support communications of data between or among the data processor 264, the data storage device 260 and one or more data ports.

In one embodiment, the data processor 264 may comprise an electronic data processor, a microprocessor, a microcontroller, a programmable logic array, a logic circuit, an arithmetic logic unit, an application specific integrated circuit, a digital signal processor, a proportional-integral-derivative (PID) controller, or another data processing device.

The data storage device 260 may comprise any magnetic, electronic, or optical device for storing data. For example, the data storage device 260 may comprise an electronic data storage device, an electronic memory, non-volatile electronic random access memory, one or more electronic data registers, data latches, a magnetic disc drive, a hard disc drive, an optical disc drive, or the like.

As shown in FIG. 2, the data ports comprise a first data port 268, a second data port 270, a third data port 272, a fourth data port 274 and a fifth data port 276, although any suitable number of data ports may be used. Each data port may comprise a transceiver and buffer memory, for example. In one embodiment, each data port may comprise any serial or parallel input/output port.

In one embodiment as illustrated in FIG. 2, the first data port 268 is coupled to the vehicle data bus 118. In turn, the vehicle data bus 118 is coupled to the controller 266. In one configuration, the second data port 270 may be coupled to the inverter circuit 188; the third data port 272 may be coupled to the sensor 115; the fourth data port 274 may be coupled to the analog-to-digital converter 122; and the fifth data port 276 may be coupled to the terminal voltage feedback module 108. The analog-to-digital converter 122 is coupled to the sensing circuit 124.

In one embodiment of the data processing system 120, the torque command generation module 105 is associated with or supported by the first data port 268 of the electronic data processing system 120. The first data port 268 may be coupled to a vehicle data bus 118, such as a controller area network (CAN) data bus. The vehicle data bus 118 may provide data bus messages with torque commands to the torque command generation module 105 via the first data port 268. The operator of a vehicle may generate the torque commands via a user interface, such as a throttle, a pedal, a controller 266, or other control device.

In certain embodiments, the sensor 115 and the primary processing module 114 may be associated with or supported by a third data port 272 of the data processing system 120.

In general, the data processor 264 may execute, determine, calculate or solve any equations or mathematical expressions set forth in this document, or variations thereof that fall within the scope of the claims, in furtherance of determining an angular rotor position or an initial rotor position of the rotor of an electric motor 117 or electric machine.

Figure 3:
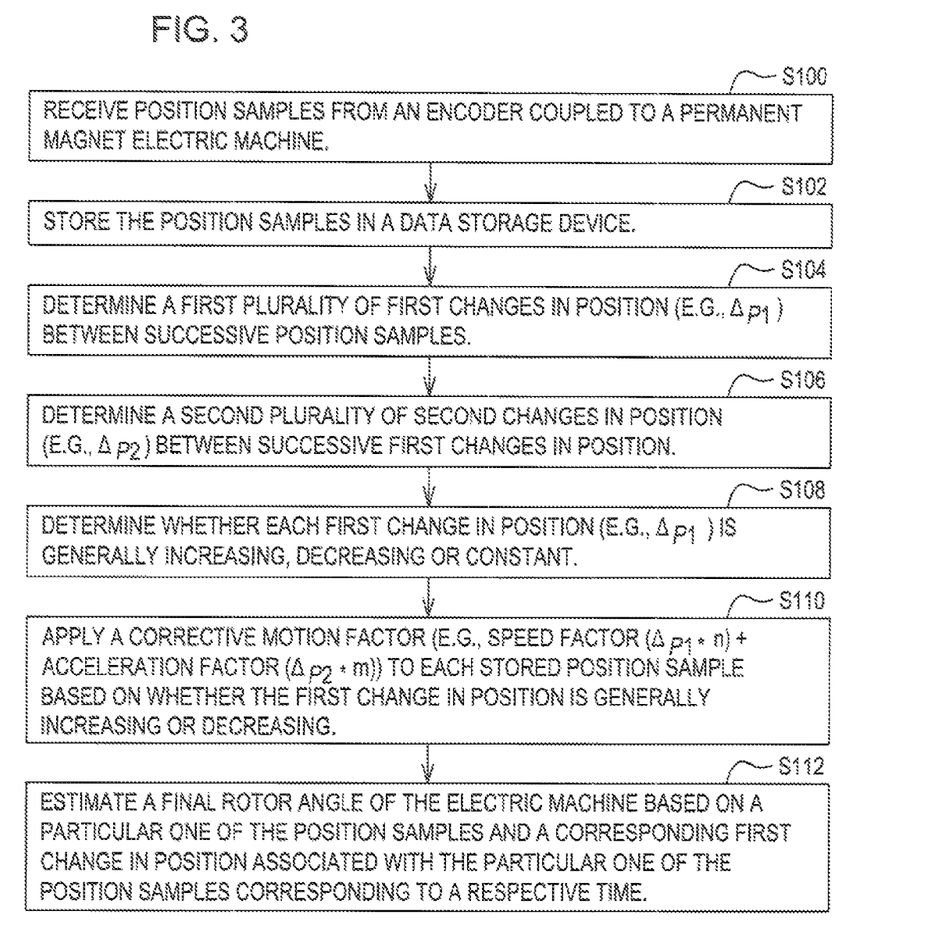
FIG. 3 is a flow chart of a first embodiment of a method for estimating rotor angle or rotor position of an electric machine.

FIG. 3 is a flow chart of a method for estimating a rotor angle of an electric machine (e.g., an electric motor or electric generator). The method can be used to determine the rotor angle or initial angular position of a motor at start up of an inverter switching circuit 188 or inverter, regardless of whether an index pulse is available from or provided by sensor 115, for example. The method of FIG. 3 begins in step S100.

In step S100, a primary processing module 114 or data processor 264 (e.g., controller digital signal processor) receives position samples (e.g., position data) from an encoder or sensor 115 coupled to a permanent magnet electric machine (e.g., motor 117). Step S100 is executed in accordance with various procedures that may be applied alternately or cumulatively. Under a first procedure, the received position samples are expressed as pulse width modulated signals in which the duty cycle of the pulse-width modulated signal is proportional to the position or rotor angle of the electric machine 17. Under a second procedure, the received position sample are expressed as pulse-width modulated signals in accordance with the following equation:

$$P = \frac{t_{on} \cdot D}{(t_{on} + t_{off})} - 1,$$

where P is an estimated position value that is indicative of or proportional to the rotor angle of the electric machine 117, $t_{on}$ is the pulse width in time units of the on-duty cycle portion of a sampled signal (e.g., at encoder output (252, 254) of sensor 115 or at quadrature decoder 200), $t_{off}$ is the pulse width in time units of the off-duty cycle portion of the sampled signal (e.g., at encoder output (252, 254) of sensor 115 or at quadrature decoder 200), D is the approximately equal to the maximum possible pulse width duration in time units (e.g., for the particular respective sensor 115).

In step S102, the data processor 264 (e.g., controller digital signal processor 256) or primary processing module 114 stores the position samples in a data storage device 260.

In step S104, the primary processing module 114 or data processor 264 (e.g., controller digital signal processor 256) determines a first plurality of first changes in position (e.g., $\Delta_{P1}$) between successive position samples.

In step S106, the primary processing module 114 or data processor 264 (e.g., controller digital signal processor 256) determines a second plurality of second changes (e.g., $\Delta_{P2}$) between successive first changes in position. For example, the second change represents the derivative of the first change in position per unit time.

In step S108, the primary processing module 114 or the data processor 264 (e.g., controller digital signal processor 256) determines a whether each first change in position is generally increasing, decreasing or constant.

In step S110, the primary processing module 114 or data processor 264 (e.g., controller digital signal processor 256) applies a corrective motion factor (e.g., speed factor ($\Delta_{P1}$*n)+ acceleration factor ($\Delta_{P2}$*m)) to each stored position sample based on whether the first change in position is generally increasing or decreasing. For example, the corrective motion factor is determined in accordance with the following equation:

$$C = \Delta_{P1}*n + \Delta_{P2}*m,$$

where C is the corrective motion factor; $\Delta_{P1}$ is a first change in position; n equals t/T, where $t = t_{final} - t_{initial}$ and $T = 1/f_{PWM}$; $\Delta_{P2}$ is a second change in position, m equals (n(n+1))/2; and $f_{pwm}$ is the frequency of a pulse width modulation signal outputted by the encoder 115 where the duty cycle of the signal is indicative of the rotor angle.

In step S112, the primary processing module 114 or data processor 264 (e.g., controller digital signal processor 256) estimates a final rotor angle or rotor position of the electric machine 117 based on a particular one of the position samples and a corresponding first change in position associated with the particular one of the position samples corresponding to a respective time. Step S112 may be carried out in accordance with various techniques, which may be applied individually or collectively. Under a first technique, the data processor 264 adds the corrective motion factor to an initial rotor angle associated with a position sample to estimate the final rotor angle if the first change in position generally increases for a time interval. Under a second technique, the data processor 264 subtracts the corrective motion factor from an initial rotor angle associated with a position sample to estimate the final rotor angle if the first change in position generally decreases for a time interval. Under a third technique, the corrective motion factor is not used (e.g., temporarily for at least one time interval or sampling period of the received data position samples) to estimate the final rotor angle if the first change in position is constant or approximately zero for a time interval. As used herein, approximately zero shall mean zero plus or minus one fifth.

Figure 4:
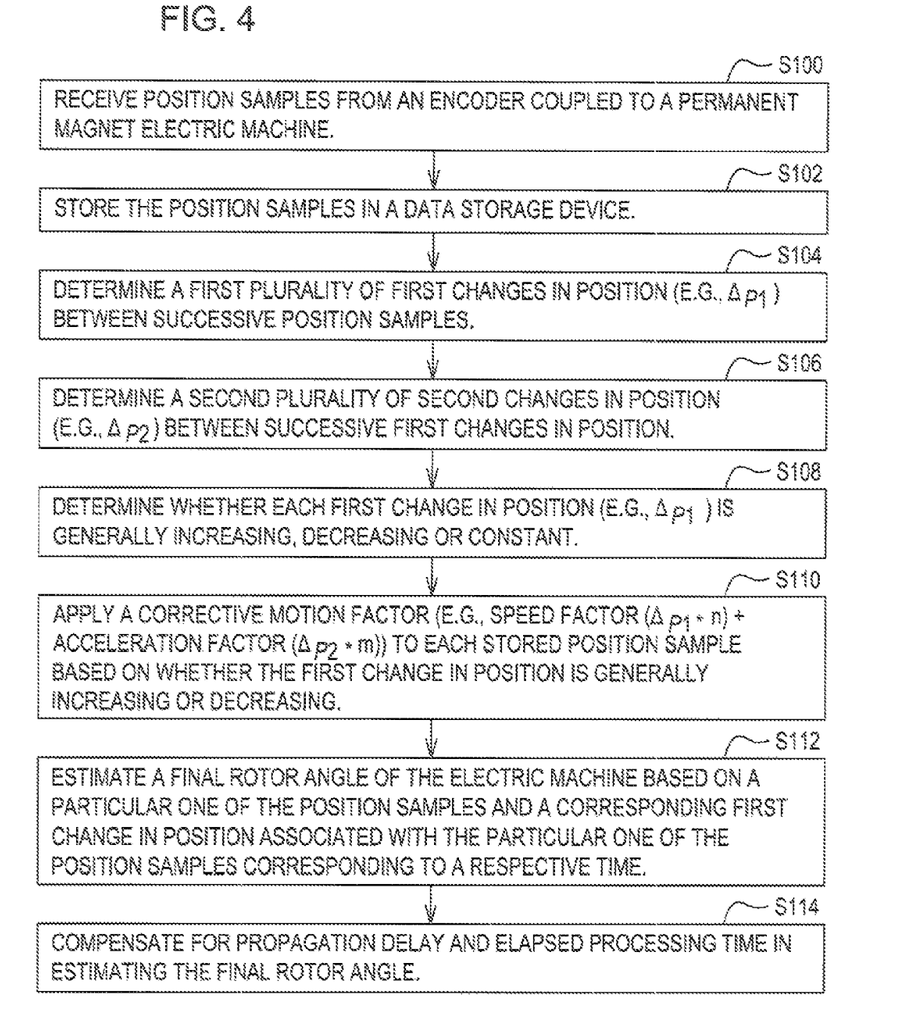
FIG. 4 is a flow chart of a second embodiment of a method for estimating rotor angle or rotor position of an electric machine.

The method of FIG. 4 is similar to the method of FIG. 3, except the method of FIG. 4 further comprises step S114. Like steps or procedures in FIG. 3 and FIG. 4 are indicated by like reference numbers.

In step S114, the primary processing module 114 or the data processor 264 (e.g., controller digital signal processor 256) compensates for propagation delay and elapsed processing time in estimating the final rotor angle or determines a compensated final rotor angle. In an alternate embodiment, the primary processing module 114 or the data processor 264 compensates for propagation delay or elapsed processing time in estimating the final rotor angle or determining the compensated final rotor angle. The propagation delay refers to the amount of time or delay between the time that the sample (e.g., position data sample) is taken (from the magnetic field sensor 206 (e.g., Hall sensor array on the sensor 115, which may comprise an application specific integrated circuit (ASIC)) until the sample is converted and available as angular data at the PWM interface (252) and incremental interface (254). The elapsed processing time comprises a difference between a first time and a second time, where the first time is when particular position samples are received from encoder 115 as the data processor 264 or the primary data processing module 114 (e.g., in step S100) and where the second time is when the final rotor angle is estimated (e.g., in step S112). For example, the elapsed time may be equal to or proportional to n, where n equals t/T, where $t = t_{final} - t_{initial}$ and $T = 1/f_{PWM}$. The primary processing module 114 or the data processor 264 uses rotor speed, rotor acceleration data, or both during the elapsed processing time to estimate a compensating position component to be added to the final rotor angle of step S112 for determination of a compensated final rotor angle that compensates for any error in the final position associated with the elapsed processing time or propagation delay.

Figure 5:
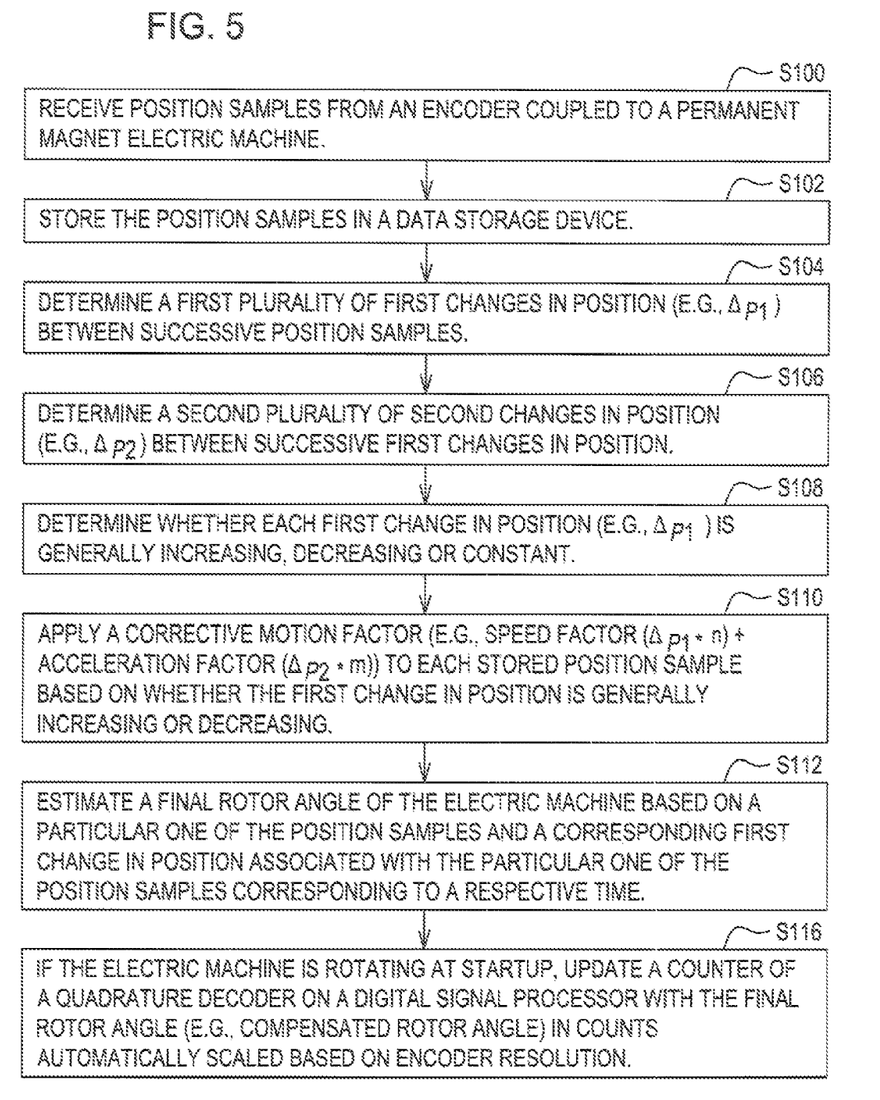
FIG. 5 is a flow chart of a third embodiment of a method for estimating rotor angle or rotor position of an electric machine.

The method of FIG. 5 is similar to the method of FIG. 3, except the method of FIG. 4 further comprises step S116. Like steps or procedures in FIG. 3 and FIG. 5 are indicated by like reference numbers.

In step S116, if the electric machine (e.g., 117) is rotating at startup, the primary processing module 114 or the data processor 264 updates a counter 202 of the decoder 200 (e.g., quadrature decoder) on a controller digital signal processor 256 with the final rotor angle (e.g., compensated rotor angle) in counts automatically scaled based on encoder resolution.

Figure 6:
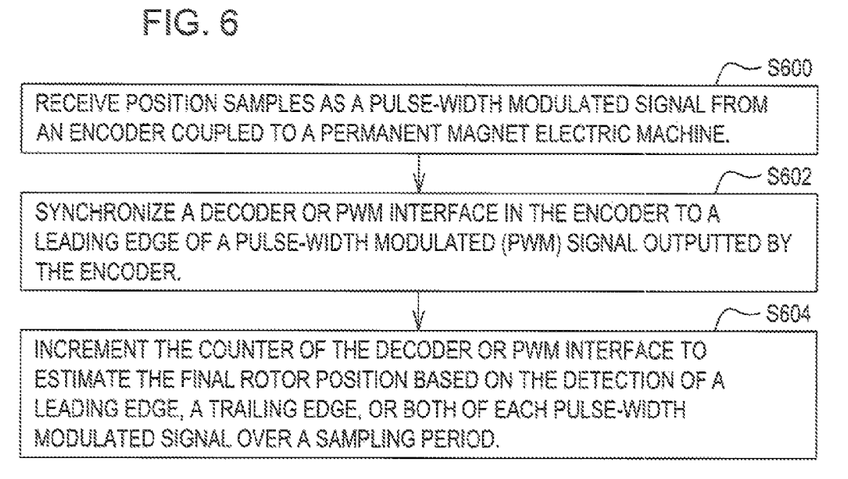
FIG. 6 is a flow chart of an alternative embodiment of a method for estimating rotor angle or rotor position of an electric machine.

The method of FIG. 6 illustrates an alternative embodiment of a method for estimating rotor angle of an electric machine. The method of FIG. 6 begins in step S600.

In step S600, a data processor 264 (e.g., controller digital signal processor 256) or primary processing module 114 receives position samples as pulse-width modulated signal from an encoder 115 coupled to a permanent magnet electric machine 117.

In step S602, the data processor 264 (e.g., controller digital signal processor 256) or primary processing module 114 synchronizes a decoder 200 in controller digital signal processor 256 or data processor 264 to a leading edge of a pulse width modulated (PWM) signal outputted by the encoder 115. For example, the PWM output (e.g., 252) of the encoder 115 may be connected to the strobe input of the quadrature decoder 200 or controller digital signal processor 256 to facilitate synchronization of the decoder or controller digital signal processor 256 to the leading edge of the pulse of the signal outputted by the encoder 115.

In step S604, the data processor 264 (e.g., controller digital signal processor 256) or a logic circuit increments the counter 202 (FIG. 1B) of the decoder 200 to estimate the final rotor position based on the detection of a leading edge, a trailing edge, or both of each pulse width modulated signal over a sampling period. For example, if the PWM output (e.g., 252) of the encoder 115 is connected to the strobe input of the quadrature decoder 200 (e.g., quadrature decoder), on the detection of the strobe event the quadrature decoder counter 202 is reset to zero and on each subsequent detected edge, the value returned by the absolute position is updated to the quadrature decoder. Accordingly, once the quadrature decoder 200 is synchronized to detect the edge, the quadrature decoder 200, and hence the encoder 115 and electronic data processing system 120 (e.g., data processor 264 or controller digital signal processor 256), can track the rotor position with high accuracy.

The method and system of FIG. 1A through FIG. 6, inclusive, disclosed herein is well suited for achieving accurate estimations of the rotor angle or position of a rotor in an electric machine (e.g., electric motor), regardless of the rotational speed of the rotor (e.g., low rotational speed of the rotor, such as 100 RPM or lower) and regardless of whether or not the rotor of the electric machine has rotor saliency. Further, the method and system of FIG. 1A through FIG. 6, inclusive, does not depend upon any motor parameter and does not need voltage phase or current phase information to estimate the rotor angle. The method and system disclosed herein is well suited for application to virtually any type of electric motor and is less computationally intensive than certain prior art configurations, such as those that use voltage phase and current phase to estimate rotor position. For example, the method and system disclosed herein provides an accurate estimate of rotor angle and initial rotor angle at startup of the electric machine without the need to characterize the magnetic field or pole configuration of a particular motor or to sense the back-electromotive force, which is only usable within certain ranges of rotational speed.

Advantageously, the method and system disclosed herein facilitates determination of initial rotor angle without any requirement for an index pulse from the encoder to determine the initial rotor angle when the motor is at a standstill or rotating at controller startup. Instead, the initial rotor angle is estimated based on whether the motor is stationary or moving at startup, with application of appropriate motion correction factors (e.g., to provide an initial position correction to the quadrature decoder or encoder as feedback data or a feedback signal).

Having described the preferred embodiment, it will become apparent that various modifications can be made without departing from the scope of the invention as defined in the accompanying claims.

The following is claimed:

1. A method for estimating rotor angle of an electric machine, the method comprising:
    receiving position samples from an encoder coupled to a permanent magnet electric machine;
    storing the position samples in a data storage device;
    determining a first plurality of first changes in position between successive position samples;
        determining a second plurality of second changes between successive first changes in position;
        determining whether each first change in position is generally increasing, decreasing or constant;
        applying a corrective motion factor to each stored position sample based on whether the first change in position is generally increasing or decreasing, wherein the corrective motion factor is determined in accordance with the following equation:

$$C = \Delta_{P1} * \Delta_{P2} * m,$$

where C is the corrective motion factor; $\Delta_{P1}$ is a first change in position; n equals t/T, where $t = t_{final} - t_{initial}$ and $T = 1/f_{PWM}$; $\Delta_{P2}$ is a second change in position, m equals $(n(n+1))/2$; and $f_{pwm}$ is the frequency of a pulse width modulation signal outputted by the encoder where the duty cycle of the signal is indicative of the rotor angle; and
    estimating a final rotor angle of the electric machine based on a particular one of the position samples and a corresponding first change in position associated with the particular one of the position samples corresponding to a respective time.

2. The method according to claim 1 wherein the received position samples are expressed as pulse width modulated signals in which the duty cycle of the pulse width modulated signal is proportional to the position or rotor angle of the electric machine.

3. The method according to claim 2 wherein the received position samples are expressed as pulse width modulated signals in accordance with the following equation:

$$P = \frac{t_{on} \cdot D}{(t_{on} + t_{off})} - 1,$$

where P is an estimated position value that is proportional to the rotor angle of the electric machine, $t_{on}$ is the pulse width in time units of the on-duty cycle portion of a sampled signal, $t_{off}$ is the pulse width in time units of the off-duty cycle portion of the sampled signal, D is the approximately equal to the maximum possible pulse width duration in time units.

4. The method according to claim 1, wherein the corrective motion factor is added to an initial rotor angle associated with a position sample to estimate the final rotor angle if the first change in position generally increases for a time interval.

5. The method according to claim 1 wherein the corrective motion factor is subtracted from an initial rotor angle associated with a position sample to estimate the final rotor angle if the first change in position generally decreases for a time interval.

6. The method according to claim 1 wherein the corrective motion factor is not used to estimate the final rotor angle if the first change in position is constant for a time interval.

7. The method according to claim 1 further comprising:
    if the electric machine is rotating at startup, updating a counter of a decoder or a digital signal processor with the compensated final rotor angle in counts automatically scaled based on encoder resolution.

8. A system for estimating rotor angle of an electric machine, the system comprising:
    an encoder coupled to a permanent magnet electric machine;
    a primary processing module for receiving position samples from the encoder and storing the position samples in a data storage device;
    a data processor of the primary processing module determining a first plurality of first changes in position between successive position samples, determining a second plurality of second changes between successive first changes in position, and determining whether each first change in position is generally increasing, decreasing or constant;
    the data processor applying a corrective motion factor to each stored position sample based on whether the first change in position is generally increasing or decreasing, wherein the corrective motion factor is determined in accordance with the following equation:

$$C = \Delta_{P1} * n + \Delta_{P2} * m,$$

where C is the corrective motion factor; $\Delta_{P1}$ is a first change in position; n equals t/T, where $t = t_{final} - t_{initial}$ and $T = 1/f_{PWM}$; $\Delta_{P2}$ is a second change in position, m equals $(n(n+1))/2$; and $f_{pwm}$ is the frequency of a pulse width modulation signal outputted by the encoder where the duty cycle of the signal is indicative of the rotor angle; and the data processor estimating a final rotor angle of the electric machine based on a particular one of the position samples and a corresponding first change in position associated with the particular one of the position samples corresponding to a respective time.

9. The system according to claim 8 wherein the received position samples are expressed as pulse width modulated signals in which the duty cycle of the pulse width modulated signal is proportional to the position or rotor angle of the electric machine.

10. The system according to claim 9 wherein the received position samples are expressed as pulse width modulated signals in accordance with the following equation:

$$P = \frac{t_{on} \cdot D}{(t_{on} + t_{off})} - 1,$$

where P is an estimated position value that is proportional to the rotor angle of the electric machine, $t_{on}$ is the pulse width in time units of the on-duty cycle portion of a sampled signal, $t_{off}$ is the pulse width in time units of the off-duty cycle portion of the sampled signal, D is the approximately equal to the maximum possible pulse width duration in time units.

11. The system according to claim 8 wherein the data processor is configured or instructed to add the corrective motion factor to an initial rotor angle associated with a position sample to estimate the final rotor angle if the first change in position generally increases for a time interval.

12. The system according to claim 8 wherein the data processor is configured or instructed to subtract a corrective motion factor from an initial rotor angle associated with a position sample to estimate the final rotor angle if the first change in position generally decreases for a time interval.

13. The system according to claim 8 wherein the data processor does not use corrective motion factor or sets the corrective motion factor to zero to estimate the final rotor angle if the first change in position is constant or approximately zero for a time interval.

14. The system according to claim 8 wherein the data processor compensates for propagation delay or an elapsed processing time in estimating the final rotor angle.

15. The system according to claim 8 further comprising:
a controller digital signal processor coupled to the encoder;
a counter of the controller digital signal processor, the counter arranged to compensate the final rotor angle in counts automatically scaled based on encoder resolution.

16. A method for estimating rotor angle of an electric machine, the method comprising:
receiving position samples from an encoder coupled to a permanent magnet electric machine;
storing the position samples in a data storage device;
determining a first plurality of first changes in position between successive position samples;
determining a second plurality of second changes between successive first changes in position;
determining whether each first change in position is generally increasing, decreasing or constant;
applying a corrective motion factor to each stored position sample based on whether the first change in position is generally increasing or decreasing;
estimating a final rotor angle of the electric machine based on a particular one of the position samples and a corresponding first change in position associated with the particular one of the position samples corresponding to a respective time; and
compensating for propagation delay or elapsed processing time in estimating the final rotor angle.

17. The method according to claim 16 wherein the received position samples are expressed as pulse width modulated signals in which the duty cycle of the pulse width modulated signal is proportional to the position or rotor angle of the electric machine.

18. The method according to claim 17 wherein the received position samples are expressed as pulse width modulated signals in accordance with the following equation:

$$P = \frac{t_{on} \cdot D}{(t_{on} + t_{off})} - 1,$$

where P is an estimated position value that is proportional to the rotor angle of the electric machine, $t_{on}$ is the pulse width in time units of the on-duty cycle portion of a sampled signal, $t_{off}$ is the pulse width in time units of the off-duty cycle portion of the sampled signal, D is the approximately equal to the maximum possible pulse width duration in time units.

19. The method according to claim 16 wherein the corrective motion factor is not used to estimate the final rotor angle if the first change in position is constant for a time interval.

20. The method according to claim 16 further comprising:
if the electric machine is rotating at startup, updating a counter of a decoder or a digital signal processor with the compensated final rotor angle in counts automatically scaled based on encoder resolution.

* * * * *